Oct. 4, 1960 H. J. McCREARY 2,955,166

CALLING STATION DETECTOR

Filed Dec. 15, 1958 5 Sheets-Sheet 1

*INVENTOR.*
HAROLD J. McCREARY
*BY* C. R. Sipe
ATTY.

CALLING STATION DETECTOR

Filed Dec. 15, 1958

INVENTOR.
HAROLD J. McCREARY
BY C. R. Sipe
ATTY.

Oct. 4, 1960 H. J. McCREARY 2,955,166

CALLING STATION DETECTOR

Filed Dec. 15, 1958 5 Sheets-Sheet 3

*INVENTOR.*
HAROLD J. Mc CREARY
*BY* C. R. Sipe
ATTY.

CALLING STA. DETECTOR 110

INVENTOR.
HAROLD J. McCREARY
BY C. R. Sipe
ATTY.

Oct. 4, 1960 H. J. McCREARY 2,955,166

CALLING STATION DETECTOR

Filed Dec. 15, 1958 5 Sheets-Sheet 5

INVENTOR.
HAROLD J. McCREARY
BY C. R. Sipe
ATTY.

United States Patent Office 2,955,166

Patented Oct. 4, 1960

2,955,166

CALLING STATION DETECTOR

Harold J. McCreary, Lombard, Ill., assignor to Automatic Electric Laboratories, Inc., a corporation of Delaware Filed Dec. 15, 1958, Ser. No. 780,371

13 Claims. (Cl. 179—18)

This invention pertains to telephone systems which are provided with means for identifying calling station directory numbers and pertains especially to improvements over the system for identifying such numbers which is disclosed in the co-pending U.S. application of J. E. Ostline, I. V. Coleman and J. W. Taugner, Serial No. 628,474, filed December 3, 1956. Calling line identifying devices are necessary when items of information pertaining to telephone calls, including the identity of the station from which such calls are placed are to be automatically recorded for billing purposes.

While the calling line identification apparatus disclosed in the above application is entirely satisfactory, it is less economical of space than is desired, and expensive to manufacture because of the large number of relays contained therein.

Accordingly, it is an object of the present invention to provide in a telephone system of the type noted an improved calling station detector which is economical to manufacture, and small in size.

A further object of this invention shall be to provide a calling station detector utilizing solid state electronic components in a telephone system of the electromechanical type.

A still further object of this invention is elimination of large quantities of relays normally associated with existing calling station detectors now in use.

A particular feature of this invention shall be to provide a calling station detector including registers consisting of two-core-per-bit magnetic shift registers.

Further objects and features of the invention pertain to the particular arrangement of the circuit elements of the system whereby in the above outline, additional operating features are obtained.

Figure 1:
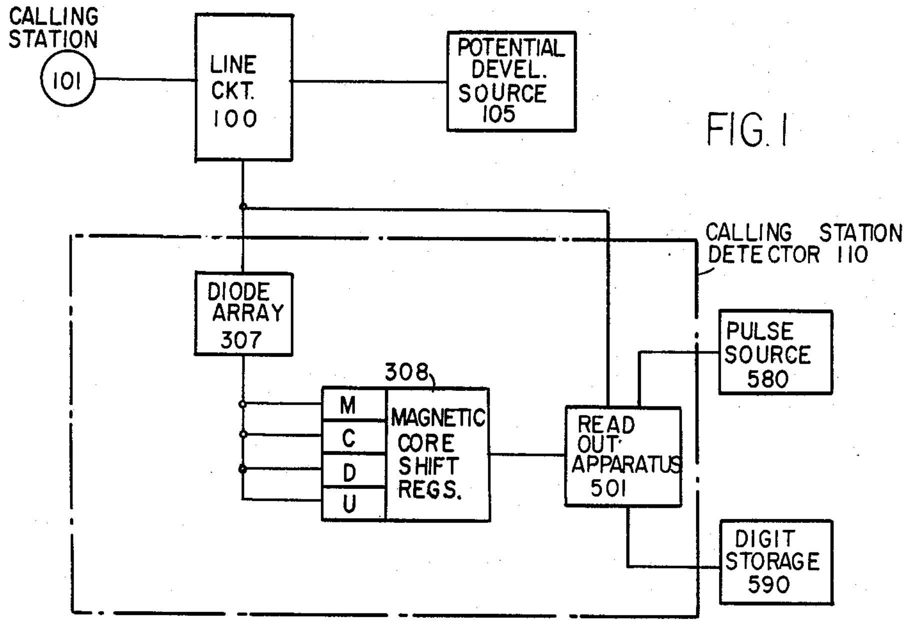
Figure 2:
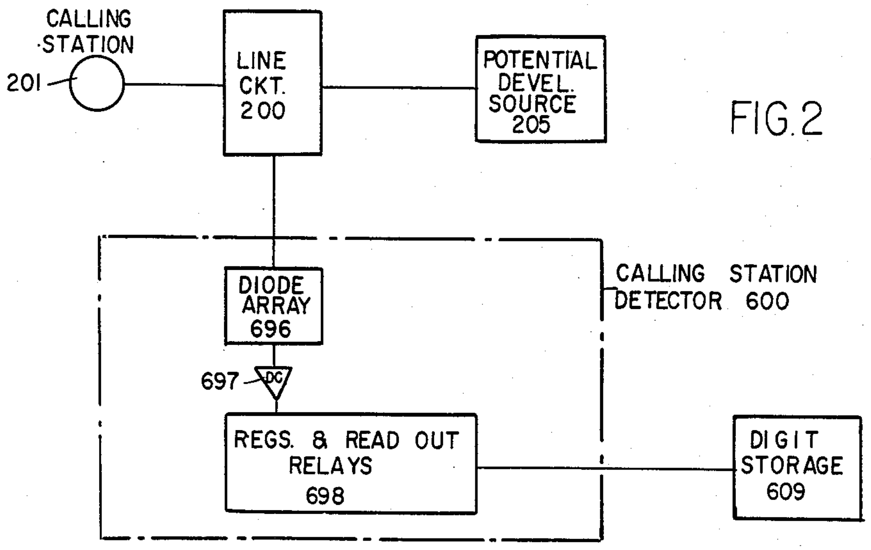

The invention, both as to its organization and method of operation, together with further objects and advantages thereof, will best be understood by reference to the following specification taken in connection with the accompanying drawings in which Figs. 1 and 2 are diagrams of calling station detector apparatus, and those portions of the apparatus incorporated in the telephone exchange with which the calling station detector is associated. More particularly, Fig. 1 illustrates a calling station detector in which the read-out of the calling station number, as registered, is transmitted in sequential pulse form, Fig. 2 illustrates a calling station detector in which the read-out apparatus transmits the digits of the calling station number registered in the detector simultaneously to the ticketer or other recording device.

Figure 3:
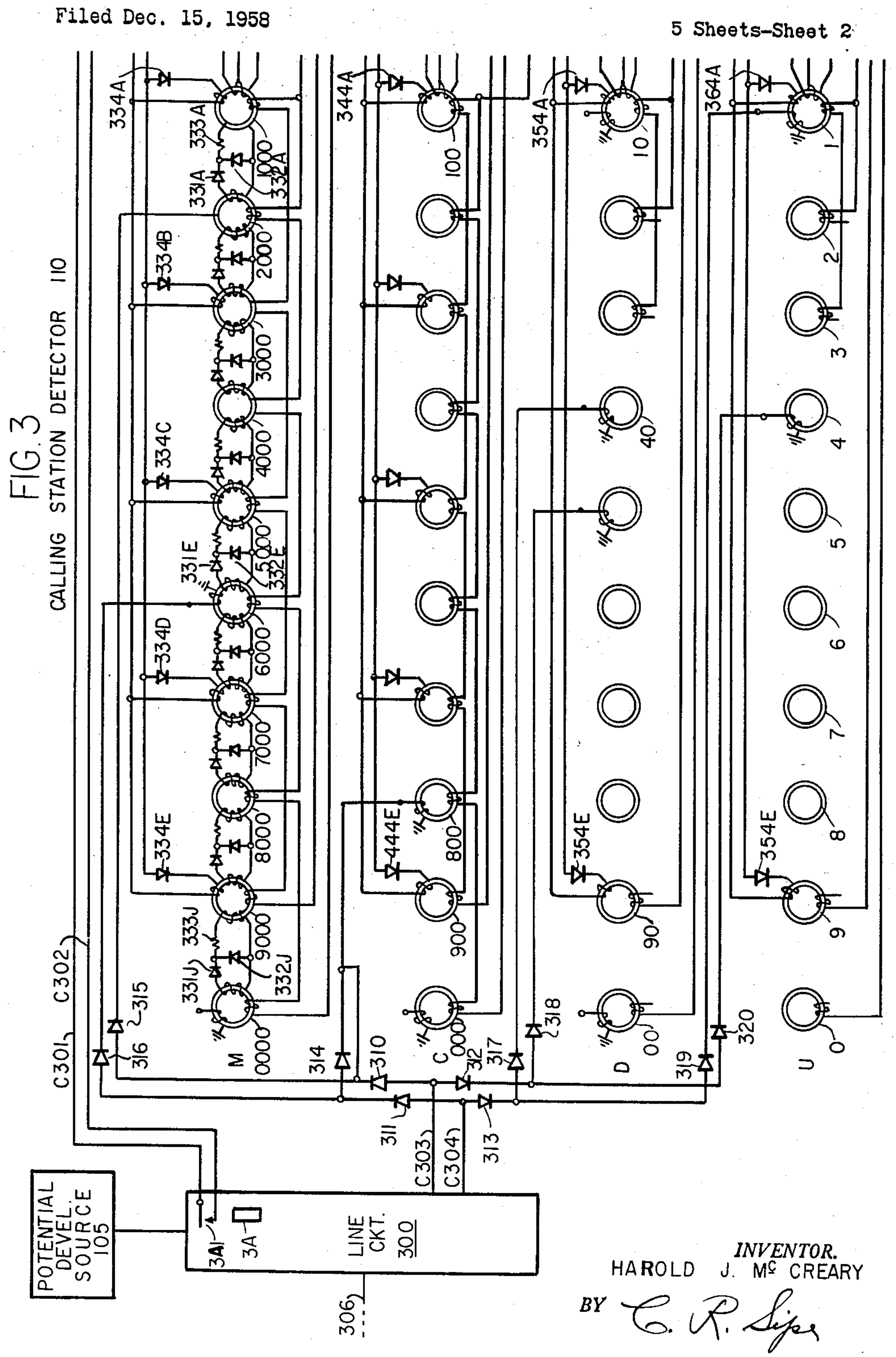
Figure 4:
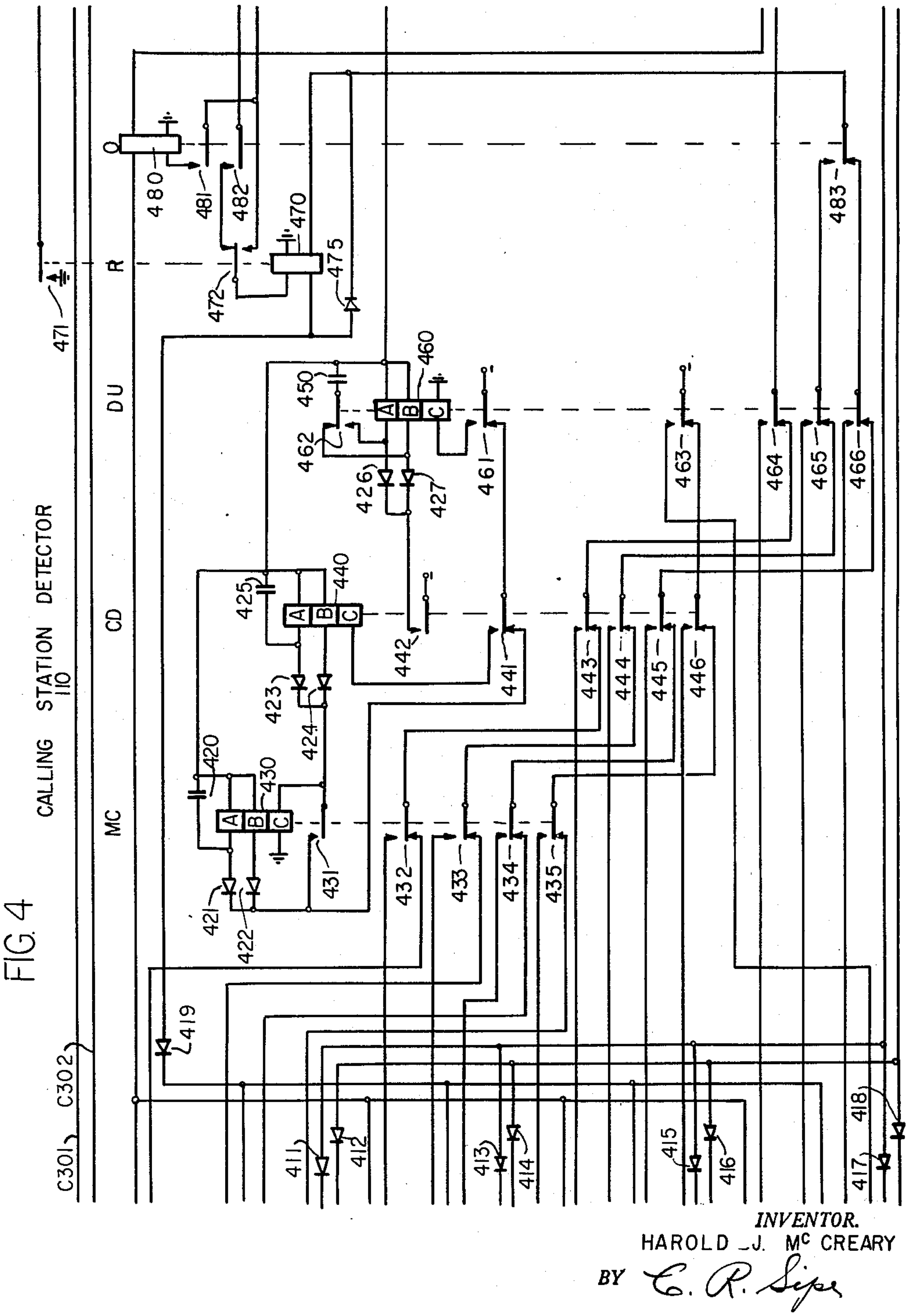
Figure 5:
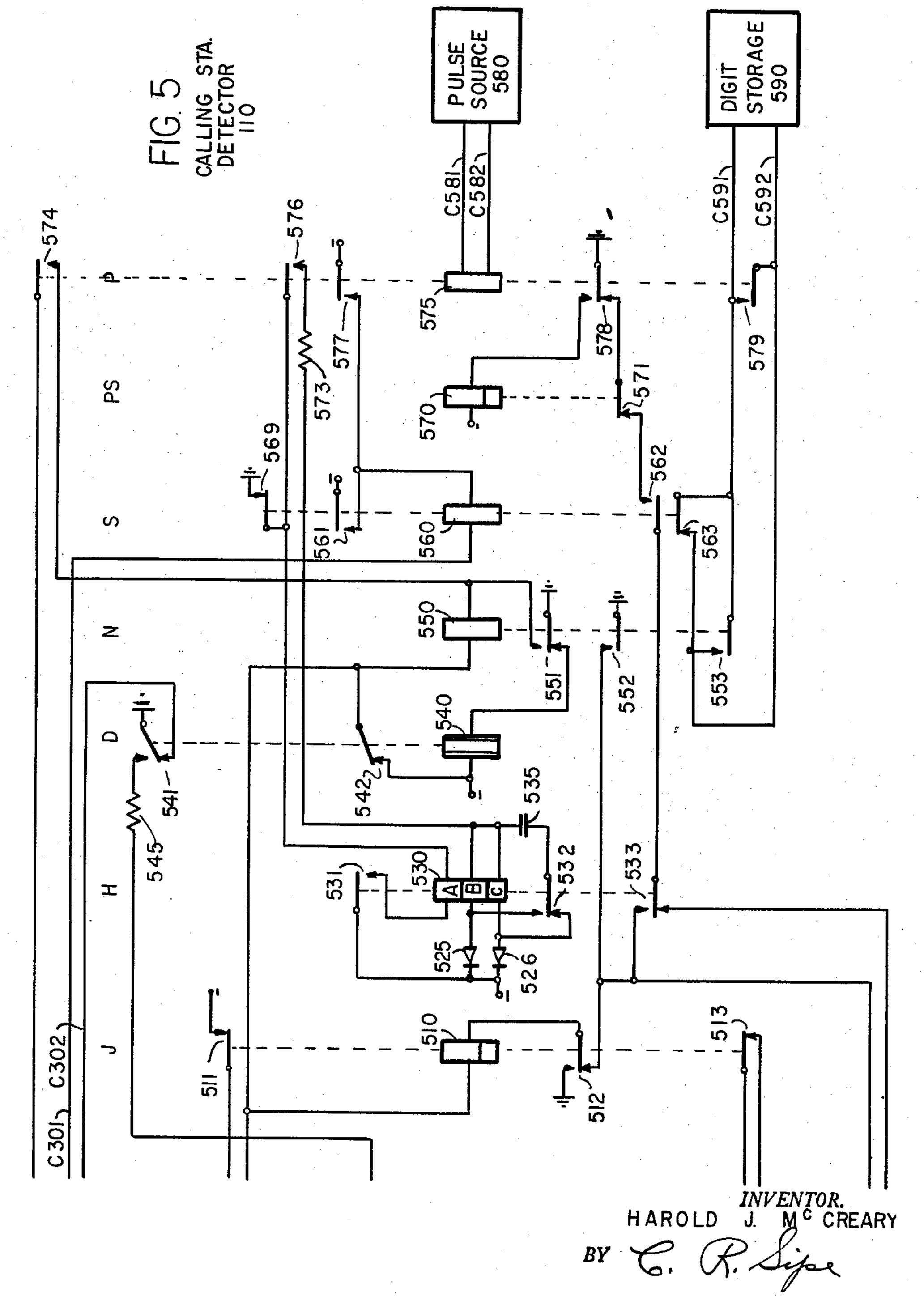

Figs. 3, 4, and 5, in combination, schematically illustrate the circuit of the calling station detector in the sequential output transmission form.

Figure 6:
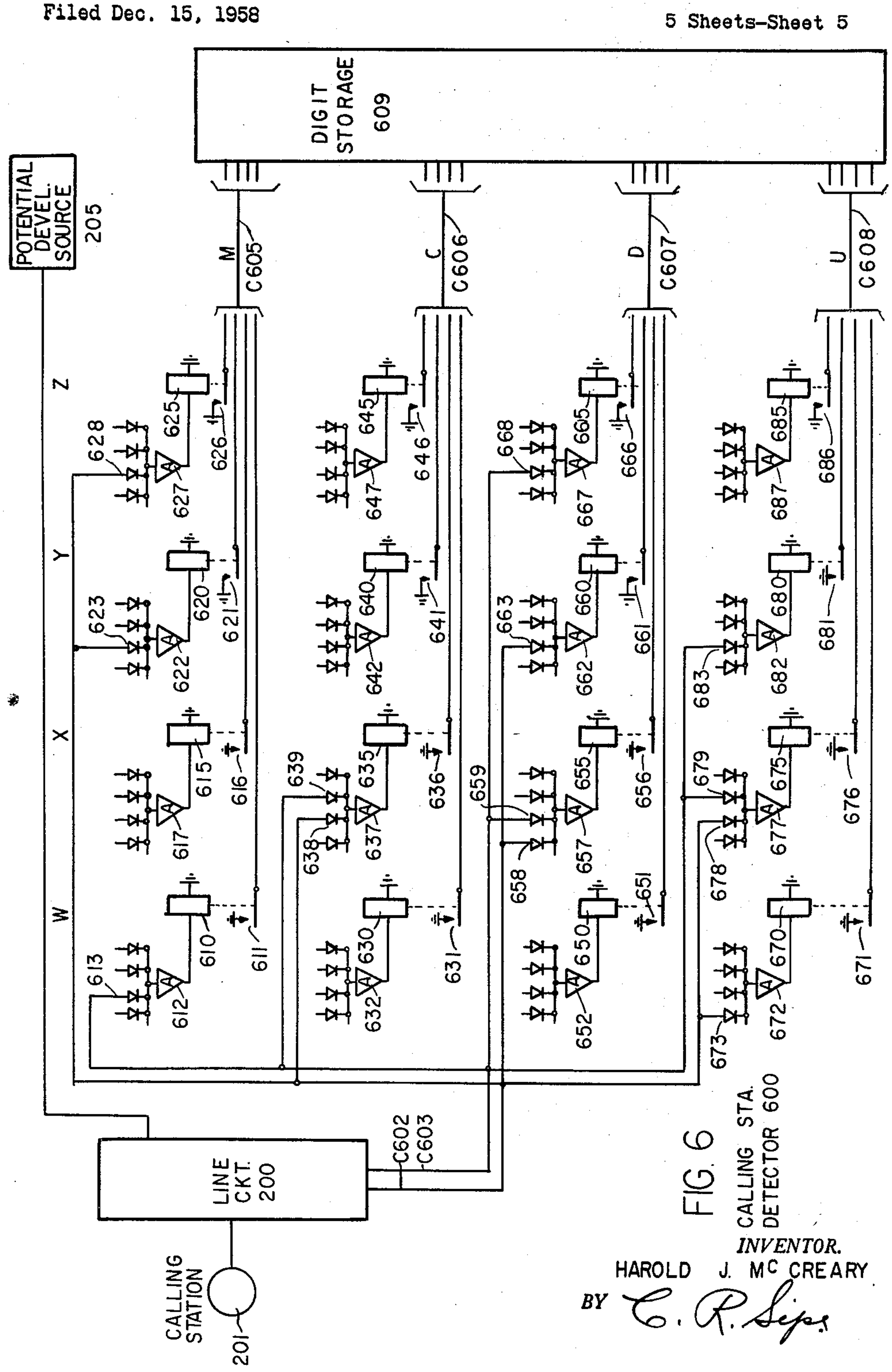

Fig. 6 is a schematic circuit diagram of a calling station detector for simultaneous transmission of the calling station directory number store therein.

A calling station detector 110 of the type having sequential read-out of the directory number stored therein is shown in Fig. 1, and comprises a diode array 307, a magnetic shift register 308, and a read-out apparatus 501. Also shown in Fig. 1 for better understanding of the operation of the calling station detector 110, are a calling station 101, a line circuit 100, a potential developing source 105, a pulse source 580, and a digit storage apparatus 590.

Simply described, operation of the calling station detector 110 of Fig. 1, is as follows: When the calling station 101 initiates a call, a momentary pulse from the potential development source 105 is provided to the line circuit 100 associated with the calling station. This potential is then directed through an array of back-feed preventing diodes 307 to four magnetic shift registers 308, each register consisting of ten magnetic cores.

The first register or rank M of cores registers numbers 1000, 2000, 3000, etc., the second register or rank C registers numbers 100, 200, 300, etc., the third register or rank D registers numbers 10, 20, 30, etc., the fourth and final register, also known as rank U, registers numbers 1, 2, 3, etc.

Windings on the cores conducting the potential developed and present in the line circuit are effective to cause those cores representative of the four decimal digits of the calling station directory number to go to a saturated state. By saturation of the aforementioned cores, the calling station directory number is registered.

The calling station directory number is read out and transmitted to the digital storage device 590 as follows: When the calling station seizes its associated line circuit a contact is closed to start the read-out device 501 operation, the pulse source 580 connected to the read-out device operates various relays therein to effectively scan the first rank of cores for the number registered therein by noting which core has been driven to a saturated state.

When the saturated core has been discovered, additional pulses cause the saturated state to be transferred from the core that was saturated initially to its adjacent core in a descending manner, that is to say, core 6000 to 5000, 5000 to 4000, etc. Subsequent pulses effectively shift the saturated state until the first core in each rank is saturated, stopping at this time. Thus it may be seen that if the number 6000 was the number originally stored, the effective operation of the core's first rank as a shift register will occur six times. Consequently, six output pulses are transmitted to the digital storage device 590 from the read-out device 501. At this time a shift to the second rank of cores occurs and a similar series of operations takes place.

The same series of operations also takes place in the third and fourth ranks. Four decimal digits, as registered in the four ranks of cores, are transmitted in the form of sequential pulses to a digital storage device 590 for usage of such number as may be required for billing purposes, etc.

A calling station detector 600, having simultaneous transmission of the calling station number recorded therein to a digital storage device, is shown in Fig. 2 and consists of a diode array 696, a D.C. amplifier 697 and combination registering and read-out relays 698. Also shown in Fig. 2 for operational understanding of the calling station detector 600 are a calling station 201, a line circuit 200, a potential developing source 205, and a digit storage apparatus 609.

A simplified description of the operation of the calling line detector 600 is as follows: Referring to Fig. 2 an identifying potential, as noted before, is transmitted to the line circuit 200 and through an array of back-feed-preventing diodes 696 to a small D.C. amplifier 697. The amplified potential is effective to operate an associated combination registering and read-out relay 698. Each decimal number is registered in the appropriate bank, viz.

thousands, hundreds, tens or units of the registering relays. By operation of one or two combination relays in each bank, read-out on a codel (one or two markings out of four) basis is accomplished.

Thus it may be noted that a single source of identifying potential is diverted to operate one or two combination relays in each of the four ranks of combination relays. When said relays are operated, they simultaneously give a codel indication, to a digital storage device 609, of the four digits recorded.

Referring now to the combination of Figs. 3, 4 and 5; operation of the calling station detector 110, the type providing sequential transmission read-out of the calling station directory number, is as follows: Assuming that the calling station has the directory number "6841," the following sequence of operations indicate the manner in which the calling station directory number is first registered and then transmitted to a digital storage device 590.

In a manner similar to that disclosed in the aforementioned U.S. application, Serial No. 628,474, a potential is placed on conductor C304 by the firing of the gas diode of potential developing source 105; through the line circuit 800 associated with calling station 6841. This potential is then directed through diodes 311, 313, 314, 316, 317, and 319 to magnetic cores 6000, 800, 40 and 1.

These cores are constructed of material having a substantially rectangular hysteresis loop characteristic and may be made of some material such as Permalloy, powdered iron or one of the ferrites.

Windings on these cores are connected through the aforementioned rectifiers to conductor C304 so that these cores are driven to a saturated state, registering the calling station directory number, in this instance number 6841. All other cores of the circuit remain unsaturated. Connections for the saturation of cores associated with calling station directory number 2854 are also indicated in Fig. 3.

Relay 3A in the line circuit 300 closed its associated contacts 3A1 when the line circuit was seized. The closing of these contacts prepares a circuit from ground to coil 560 of relay S. A standard pulse source 580, supplying approximately 10 pulses per second is connected to coil 575 of relay P by means of conductors C581 and C582. When relay P operates shunting the pulse-out circuit at contacts 579 relay S is operated by battery extended to contact 577, and locks through its own contact 561 to battery. This opens contact 563 so that the pulse-out circuit will operate when the next pulse is introduced over conductors C581 and C582 commencing with the next circuit operation.

When relay S is operated it is possible to operate and lock relay H. Closure of relay P contact 576 supplies current equally to the two lower coils 530B and 530C. Since these two coils are equal but opposing, relay H does not operate. At the start of the first pulse-out, contact 576 opens removing the current in coils 530B and 530C, but since condenser 535 was charged while contact 576 was closed, condenser 535 now discharges into coil 530C. Since coil 530C is no longer opposed by coil 530B, relay H operates and locks with a continuous circuit to contact 531 and coil 530A. When relay H operates condenser 535 shunts coil 530B to a circuit extending over contact 532.

As noted in the foregoing description, relay P has now released for the beginning of the first pulse period; relay H is operated, also contact 578 is open but since relay PS is a slow-to-operate relay, it releases only after the foregoing events have transpired.

When relay PS releases, a ground pulse is forwarded to all the odd-numbered cores. Since none of the odd-numbered cores of rank M has received a marking, no action occurs. However, relay J is operated by extension of ground through contacts 578, 571, 562, and 533 to coil 510 of relay J and then through contact 542 to battery. Relay J is then locked up through the following circuit: From ground through contact 512 to coil 510 at relay J and then through contact 542 to battery. Relay contact 512 on relay J is of the make-before-break variety.

Since operation depends on pulses from the cores and since no marking was placed on the odd-numbered cores, it should be noted that relay J in operating opened the circuit to relay O so that if the first pulse did not find one of the odd cores marked then relay O can never operate again for this digit. Relay O is capable of receiving pulses from any odd-numbered core in the rank of cores being analyzed. This circuit is opened at relay contact 513 after the first pulse due to the time delay of slow-to-operate relay J. Relay J is rendered slow-to-operate because of the copper slug used in connection with coil 510.

To insure the operation of relay R a circuit extends from coil 470 of relay R through diode 419 to core 1000, from core 1000 to contacts 433, 444, 466, and 483. From contact 483, the circuit is completed to coil 470 of relay R. Since afore-mentioned relay J is a slow-to-operate relay, coil 480 of relay O will receive plenty of energy by induction from the odd-numbered cores if the change is stored there. Relay O is fast-acting so that for a time while relay J is unoperated relay O is operated. Negative battery flows through contacts 511, 482 and 472 to coil 470 of relay R, thence to ground causing relay R to operate and lock up through contact 472, and contact 542 to negative battery.

It is obvious then that relay O will operate and lock in the operated position if the digit can be read out as an odd number. Relay O however will stay inoperative if the digit to be sent was stored in one of the even-numbered cores. Since the digit stored in the first rank of cores was "6," an even number, the condition of the relays is as follows: relays S, D, H, and J operated and relays P, PS, M, O, R, MC, CD, and DU unoperated and the magnetic charge still in core 6000, rank M.

Relay P now operates, removing ground from the odd-numbered cores. Relay PS operates; by extension of ground over contact 578, to coil 570. Ground from contact 564 was forwarded through contact 576 and resistance 573 to coils 530B and 530C of relay H. Relay H remains operated by virtue of the current in coil 530A. Because of the direction of current flowing in coil 530B and coil 530C, they effectively nullify each other, and the condition of relay H remains unchanged. However, at the beginning of the next pulse interval relay P is released and contact 576 opens. When contacts 576 open the current in the lower two coils of relay H ceases. But since condenser 535 was charged when contact 576 was closed, it now discharges through the central coil 530B of relay H. Since coil 530B then is in opposition to lock up coil 530A relay H restores to normal.

As noted in the foregoing description relay P is now inoperative awaiting the beginning of the second or even pulse. The H relay has also been released. Contact 578 is open after these events and slow-to-operate relays PS releases. When relay PS releases, a ground pulse is forwarded to all of the even numbered cores of rank M. Since it was one of these cores, designated 6000, that was charged, this charge is moved then from core 6000 to core 5000 through coupling rectifiers 331E and 332E. The next or third pulse moves this magnetic charge to the core designated 4000, a fourth pulse moves the magnetic charge to the core designated 3000, the next or fifth pulse moves the magnetic charge to the core designated 2000. The next or sixth pulse moves the magnetic charge to the core designated 1000. Since relay O is inoperative the magnetic charge on entering core 1000 induces a pulse in read-out relay R which operates and locks to its own contact 472, forwarding ground to coil 550 of relay N to release relay N. When relay P completes the pulse it operates. At this instant relay N operates by extension of ground over contacts 471 and 574, locking up to contact 551.

It will be noted that six complete pulses (circuit interruptions) over conductors C591 and C592 have been sent to the digit storage device 590, and the pulse-out circuit is now short-circuited by means of contacts 579. It may also be noted the relay H insures that the odd numbered pulses are supplied to the odd numbered cores while the even numbered pulses are supplied to the even numbered cores.

When relay N operated and locked up, it short-circuited the pulse-out circuit at contact 553 and opened the circuit at contact 551, coil 540 of relay D. Relay D is a very slow-to-release relay requiring about .374 second to release. When relay D releases it opens contact 542 which supplied battery to all lock-up relays in the system except shift relays MC, CD and DU so the system is restored to normal. Relay N and relay PS are released and relay D is again operated. However, when relay D was released it forwarded ground through contact 541 and resistance 545 to coils 430A and 430B on shift relay MC. The current in these two coils cancel each other until relay D operates at which time shift relay MC operates and locks up, shifting all the necessary leads from the M to the C rank of cores so that the digits stored in rank C can next be read out. Before relay D has released and while relay N is operated, the ground connection is forwarded over contact 552 to the odd numbered cores to clear the magnetic charge from core 1000.

The foregoing operating procedure now repeats for the next rank of cores designated C. When this is completed the process is repeated again for the next rank of cores designated D. And when this is completed the foregoing procedure is again repeated for the next rank of cores designated U. The U rank of cores is the last to be read.

The DU relay is locked up through its contact 461. After all pulses have been sent relay D is released and ground is extended through contact 541 and resistor 545 to windings 460A and 460B of coil 460 of relay DU. Since windings 460A and 460B are in opposition, relay DU is not effective and remains operative because of the current in coil 460C. However, when relay D operates, opening contact 541, condenser 450 discharges through coil 460A placing 460A in opposition to 460C since these two coils cancel each other, relay DU releases, opening its marking contact 461. The system is now ready to receive and send another four digit number.

Detailed operation of a calling line detector 600 for simultaneous transmission of the calling station number recorded therein to a digital recorder 609 may be understood by reference to Fig. 6 and the following:

Again assuming that the calling station has the directory number "6841," the following sequence of operations indicates the manner in which the calling station number will be registered and transmitted to a digital storage device. A potential is placed on conductor C602 from the line circuit in the manner described in the aforementioned U.S. application. This potential is then directed through diodes 623, 628, 638, 658, 663, 675, and 678 to D.C. amplifiers 622, 627, 637, 657, 667, 672, and 677. These amplifiers may be of any well-known type such as vacuum tube, transistor, etc. Amplified potential from the aforementioned amplifiers is extended to combination register and read-out relays 620, 625, 635, 655, 660, 670, and 675 respectively. This potential causes these relays to operate, extending ground potential over their associated contacts 621, 626, 636, 656, 661, 671, and 676 to the digit storage 609 over cables C605, C606, C607, and C608. This extension of ground potential is on a codel (one or two markings out of four) basis, thus this operation of relays 620 and 625 in combination is effective to transmit the number "6" to digit storage 609. Likewise the operation of relay 635 transmits a ground marking to digit storage 609 indicative of the number "8." Operation of relays 655 and 660 in combination causes the codel marking for number "4" to be transmitted to digit storage 609, and finally the operation of relays 670 and 675 is effective to place the necessary ground on leads extending to storage 609 to register the final number, "1."

While the operation of the combination register and read-out relays has been taken in sequential order it should be pointed out that since potential is applied over conductor C602 through the aforementioned diodes and D.C. amplifiers to the relays at the same time, the ground potential markings extended to the digit storage 609 are done so simultaneously so that the digits of directory number "6841" are stored in one operation.

Upon storage of the calling station directory number, the detector 600 is released and prepared for detection of another number by removal of potential from conductor C601 by potential developing source 205 in a manner similar to that disclosed in the aforementioned U.S. application.

Modifications of this invention not described herein will become apparent to those skilled in the art. Therefore, it is intended the matter contained in the foregoing description and the accompanying drawings be interpreted as illustrative and not limitative, the scope of the invention being defined in the appended claims.

What is claimed is:

1. In a telephone system a digital recording device, a plurality of calling stations each having a directory number, a plurality of line circuits each associated with one of said calling stations, means for developing an identifying potential individual to each of said line circuits, a calling station detector, said detector comprising registering means including a plurality of switching devices, an array of back-feed preventing impedance devices interconnecting said line circuits with said switching devices for selectively setting said switching devices in a pattern corresponding to said directory number and means for transferring said registered directory number to said digital recording device.

2. In a telephone system, a digital recording device, a plurality of calling stations each having a directory number and a line circuit means for developing an identifying potential individual to each of said line circuits, said means comprising a plurality of gas discharge devices having first and second electrodes individual to said line circuits, a source of potential, and means for selectively applying said source of potential to the first electrode of one of said discharge devices, thereby to actuate said device to develop said identifying potential at said second electrode thereof, and a calling station detector, said detector comprising registering means including a plurality of switching devices, and an array of back-feed preventing impedance devices interconnecting said second electrode with said switching devices for selectively setting said switching devices in a pattern corresponding to said directory number and means for transferring said recorded directory number to said digital recording device.

3. In a telephone system, a digital recording device, a plurality of calling stations each having a directory number, a plurality of line circuits each associated with one of said calling stations, means for developing an identifying potential individual to each of said line circuits, a calling station detector, said detector comprising sequential read-out registering means including a plurality of solid state switching devices, an array of backfeed preventing impedance devices interconnecting each of said line circuits with said switching devices for selectively setting said switching devices in a pattern corresponding to said directory number, and read-out means for sequential transmission of said registered directory number to said digital recording device.

4. In a telephone system, a digital recording device, a plurality of calling stations each having a directory number, a plurality of line circuits each associated with a calling station, means for developing an identifying potential individual to each of said line circuits, and a calling station detector, said detector comprising sequential read-out registering means including a plurality of inductive devices with saturable cores having a substantially rectangular hysteresis loop, an array of back-feed preventing impedance devices interconnecting each of said line circuits with said inductive devices for selectively saturating said inductive devices in a pattern corresponding to said directory number, and read-out means for sequential transmission of said registered directory number to said digital recording device.

5. In a telephone system, a digital recording device, a plurality of calling stations each having a directory number, a plurality of line circuits each associated with each of said calling stations, means for developing an identifying potential individual to each of said line circuits, a calling station detector, said detector comprising magnetic shift register means including a plurality of inductive devices with saturable cores having a substantially rectangular hysteresis loop, an array of back-feed preventing impedance devices interconnecting each of said line circuits to said inductive devices for selectively saturating said inductive devices in a pattern corresponding to said directory number, and read-out means for sequential transmission of said registered directory number to said digital recording device.

6. In a telephone system, a digital recording device, a plurality of calling stations each having a directory number, a plurality of line circuits each associated with one of said calling stations, means for developing an identifying potential individual to each of said line circuits, and a calling station detector, said detector comprising shift register means including a plurality of shift registers, each of said shift registers separately registering an individual decimal digit of said directory number, said shift registers including a plurality of inductive devices with saturable cores having a substantially rectangular hysteresis loop, an array of back-feed preventing impedance devices interconnecting each of said line circuits with said inductive devices of said registers for selectively saturating said devices in a pattern corresponding to said directory number, common read-out means for sequential transmission of said registered directory number to said digital recording device.

7. In a telephone system, a digital recording device, a plurality of calling stations each having a directory number, a plurality of line circuits each associated with a calling station, means for developing an identifying potential individual to each of said line circuits, and a calling station detector, said detector including magnetic shift register means including a plurality of shift registers, each of said shift registers separately registering an individual decimal digit of said directory number, said shift registers including a plurality of inductive devices with saturable cores having a substantially rectangular hysteresis loop, an array of unidirectionally conducting devices interconnecting each of said line circuits with said inductive devices for selectively saturating said inductive devices in a pattern corresponding to said directory number, common read-out means including a pulse source, control means, and a plurality of switching devices actuated by said source to sequentially transmit said registered directory number from shift register means to said digital recording device.

8. In a telephone system a digital recording device, a plurality of calling stations each having a directory number, a plurality of line circuits each associated with one of said calling stations, means for developing an identifying potential individual to each of said line circuits and a calling station detector, said detector including a plurality of sequential read-out registers, each comprising a plurality of stages of solid state memory devices for recording the corresponding digits of said directory number, an array of back-feed preventing impedance devices interconnecting each of said line circuits with the switching devices of said registers for selectively setting said memory devices in a pattern corresponding to said directory number, read-out means including a pulse source, for counting down the digits stored in said plurality of registers, and control means for connecting said read-out means to said registers in order.

9. In a telephone system, a digital recording device, a plurality of calling stations each having a directory number, a plurality of line circuits each associated with one of said calling stations, means for developing an identifying potential individual to each of said line circuits, and a calling station detector, said detector comprising sequential read-out registering means including a plurality of inductive devices with saturable cores having a substantially rectangular hysteresis loop, an array of unidirectionally conducting devices interconnecting each of said line circuits with said inductive devices for selectively saturating said inductive devices in a pattern corresponding to said directory number, common read-out means for counting down the digits stored in said registers, comprising control means and a plurality of switching devices, said control means for sequentially connecting said read-out means to said digital storage device, said read-out means sequentially transmitting said registered directory number to said digital recording device.

10. In a telephone system, a digital recording device, a plurality of calling stations each having a directory number, a plurality of line circuits each identified with one of said calling stations, means for developing an identifying potential individual to each of said line circuits, and a calling station detector, said detector comprising a plurality of shift registers, each of said shift registers separately registering an individual decimal digit of said directory number, said shift registers each including a plurality of inductive devices with saturable cores having a substantially rectangular hysteresis loop for storing the corresponding digits of said directory number, an array of back-feed preventing impedance devices interconnecting said line circuits with the inductive devices of said registers for selectively saturating said inductive devices in a pattern corresponding to said directory number, common read-out means for the sequential transmission of said registered directory numbers to said digital recording device, said read-out means including a pulse source and a plurality of first switching devices actuated by said source to induce shift pulses in the inductive devices of said shift registers, a plurality of second switching devices to connect said first switching devices to each of said shift registers one after the other, whereby said sequential pulsing of each shift register is effective to sequentially transmit said directory number from said registers to said digital recording device.

11. In a telephone system, a digital storage device, a plurality of calling stations each having a directory number, a plurality of line circuits each associated with one of said calling stations, means for developing an identifying potential individual to each of said line circuits, and a calling station detector, said detector comprising a plurality of magnetic shift registers, each of said shift registers for separately registering an individual decimal digit of said directory number, said registers comprising a plurality of inductive devices with saturable cores having a substantially rectangular hysteresis loop, said registers including a two-core-per-bit shifting circuit for sequentially transmitting decimal digits recorded in said registers, from said registers to said digital storage device, an array including a plurality of rectifiers interconnecting each of said line circuits with the inductive devices of said registers for selectively saturating said inductive devices in a pattern corresponding to said directory number, common read-out means including a pulse source, a plurality of first switching devices actuated by said pulse source to alternately induce shift pulses in odd numbered or even numbered inductive devices of said shift registers, said shift pulses pulsing each shift register to transmit said stored individual decimal digit of said directory number from said registers to said digital storage device, and a plurality of second switching devices connecting said first switching devices to each shift register one after the other.

12. In a telephone system, a digital recording device, a plurality of calling stations each having a directory number, a plurality of line circuits each associated with one of said calling stations, means for developing an identifying potential individual to each of said line circuits, a calling station detector, said detector comprising registering means, said registering means including a plurality of registers, each of said registers separately registering an individual decimal digit of said directory number, said registers each including a plurality of switching devices, an array of unidirectionally conducting devices interconnecting each of said line circuits with said switching devices for selectively setting said switching devices of each of said registers in a pattern corresponding to the respective decimal digits of said directory number, amplifying means for supplying the necessary operating potential to said switching devices, and means for transferring said registered directory number to said digital recording device.

13. In a telephone system, the combination as claimed in claim 12 including a plurality of registers separately registering the individual decimal digits of said directory number in binary form.

References Cited in the file of this patent

UNITED STATES PATENTS 2,854,517 Hutman ---------------- Sept. 30, 1958